US008044650B2

(12) United States Patent (10) Patent No.: US 8,044,650 B2
Tang et al. (45) Date of Patent: Oct. 25, 2011

(54) METHODS AND APPARATUS FOR CURRENT SENSING IN MUTUALLY COUPLED INDUCTORS

(75) Inventors: Benjamin Tang, Rancho Palos Verdes, CA (US); Timothy M. Ng, Monterey Park, CA (US); Kenneth Ostrom, Palos Verdes Estates, CA (US)

(73) Assignee: Infineon Technologies Austria AG, Villach (AT)

( * ) Notice: Subject to any disclaimer, the term of this patent is extended or adjusted under 35 U.S.C. 154(b) by 498 days.

(21) Appl. No.: 12/332,627

(22) Filed: Dec. 11, 2008

(65) Prior Publication Data

US 2009/0146621 A1 Jun. 11, 2009

Related U.S. Application Data

(60) Provisional application No. 61/012,903, filed on Dec. 11, 2007.

(51) Int. Cl.
*G05F 1/40* (2006.01)
(52) U.S. Cl. .......................... 323/285; 323/283; 323/272
(58) Field of Classification Search .................. 323/222, 323/272, 275, 224, 282–288, 277; 363/16–17, 363/56.01, 98, 132
See application file for complete search history.

(56) References Cited

U.S. PATENT DOCUMENTS

| | | | | |
|---|---|---|---|---|
| 5,877,611 A * | 3/1999 | Brkovic | ......................... | 323/222 |
| 6,249,447 B1 * | 6/2001 | Boylan et al. | ................... | 363/97 |
| 6,469,481 B1 * | 10/2002 | Tateishi | ........................ | 323/282 |
| 6,593,724 B1 * | 7/2003 | Chen | ............................. | 323/283 |
| 6,912,144 B1 * | 6/2005 | Clavette | .......................... | 363/98 |
| 7,002,325 B2 * | 2/2006 | Harris et al. | .................. | 323/272 |
| 7,358,710 B2 * | 4/2008 | Luo et al. | ..................... | 323/282 |

* cited by examiner

*Primary Examiner* — Rajnikant Patel
(74) *Attorney, Agent, or Firm* — Coats & Bennett, P.L.L.C.

(57) ABSTRACT

Methods and apparatus for current sensing in mutually coupled inductors according to various aspects of the present invention may operate in conjunction with a control system adapted to control current through the inductors and multiple current sensors connected to the control system. Each current sensor may comprise a series combination comprising a capacitor and a resistor. The series combination may be connected in parallel with one of the inductors, and may be adapted to generate branch inductor current signals according to a sensed current in the connected inductor. In addition, a coupling capacitor may be coupled between at least two of the current sensors to compensate a time constant of the current sensor for mutual coupling inductance between the inductors.

18 Claims, 8 Drawing Sheets

METHODS AND APPARATUS FOR CURRENT SENSING IN MUTUALLY COUPLED INDUCTORS

CROSS-REFERENCES TO RELATED APPLICATIONS

This application claims the benefit of U.S. Provisional Patent Application No. 61/012,903, filed Dec. 11, 2007, and incorporates the disclosure of such application by reference.

BACKGROUND OF THE INVENTION

Switching power supplies are popular for high power applications because of the high efficiency and small area/volume required. Buck converters in particular are well suited to providing the high current at low voltages needed by high performance digital integrated circuits such as microprocessors, graphics processors, and network processors. For examples a buck converter is often used to step down a DC voltage (typically referred to as the input voltage) to a lower DC voltage (typically referred to as the output voltage). Since the power stage is fully switched (i.e., the power MOSFET is fully off or on), there is very little loss in the power stage and the converter power efficiency is very high.

The inductance value in a buck converter is typically chosen to be sufficiently high such that the ripple current is at an acceptable level. The high inductance level, however, limits the ability of the regulator to quickly change its output current. This tradeoff between ripple current and output current slew rate transient performance becomes a limiting effect on the regulator transient and steady state performance.

The tradeoff can be mitigated by replacing the inductors in a multi-phase regulator with mutually coupled inductors. Coupled inductors effectively allow the ripple current in each inductor to be reduced by using the coupling current from the other phases to cancel out the current in each phase. The reduction in ripple current allows lower value inductors to be used, which improves the output current slew rate and the regulator's transient performance.

Figure 1:
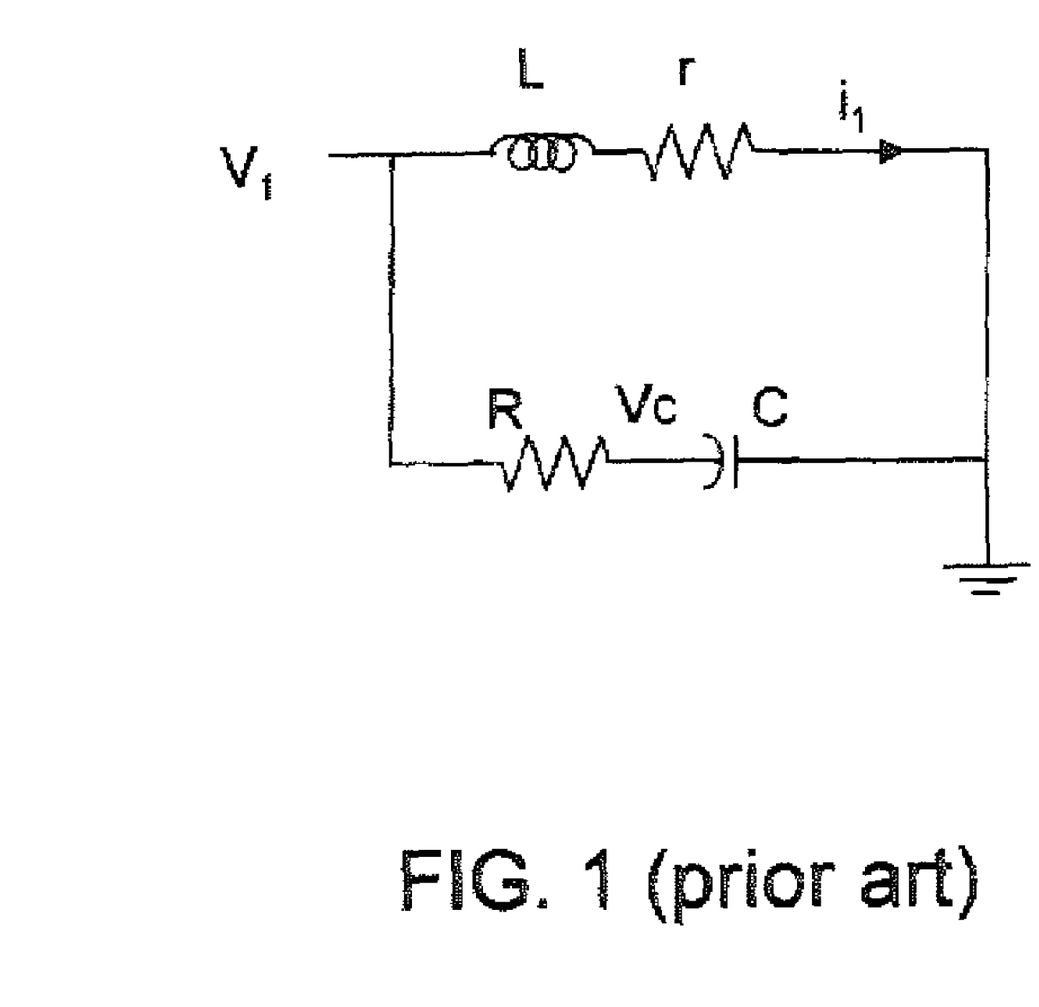
FIG. 1 is a schematic diagram of a prior art current sensor.

In addition, many power supplies operate in conjunction with current sensors to monitor the current in the power supply and the load. Referring to FIG. 1, one common lossless current sensing technique is known as inductor DCR (DC resistance) current sense. For simplification, FIG. 1 illustrates the widely used "output reference" equivalent form, where the output voltage is shown as ground, and the voltage applied across the inductor ($V_{in}-V_{out}$) is shown as V1. By adding the RC network in parallel with the inductor L with its parasitic DC resistance r and matching the time constants, the voltage across the capacitor C is proportional to the current through the inductor multiplied by the DCR. A voltage amplifier connected to the PWM controller generates the desired signal representing the current through the inductor. This method is popular because the DCR of inductors is well controlled and characterized for tolerance and temperature variation, resulting in accurate current sensing.

SUMMARY OF THE INVENTION

Methods and apparatus for current sensing in mutually coupled inductors according to various aspects of the present invention may operate in conjunction with a control system adapted to control current through the inductors and multiple current sensors connected to the control system. Each current sensor may comprise a series combination comprising a capacitor and a resistor. The series combination may be connected in parallel with one of the inductors, and may be adapted to generate a branch inductor current signal according to a sensed current in the connected inductor. In addition, a coupling capacitor may be coupled between at least two of the current sensors to compensate a time constant of the current sensor for mutual coupling inductance between the inductors.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTION OF EXEMPLARY EMBODIMENTS

The present invention may be described in terms of functional block components and various processing steps. Such functional blocks may be realized by any number of circuits, technologies, techniques, and methods configured to perform the specified functions and achieve the various results. For example, the present invention may employ various controllers, sensors, power supplies, logic circuits, amplifiers, output stages, transistors, capacitors, inductors, and the like, which may carry out a variety of functions. In addition, the present invention may be practiced in conjunction with any number of devices for performing the various functions, and the systems described are merely exemplary embodiments and applications. Further, the present invention may employ any number of conventional techniques for controlling output stages, receiving and processing signals, sensing voltages and currents, amplifying signals, and the like.

Methods and apparatus for current sensing in mutually coupled inductors according to various aspects of the present invention operate in conjunction with a current sensor adapted to sense the current in an inductor coupled to another inductor. For example, referring to FIG. 2, a power supply 100 for supplying current to a load 102 according to various aspects of the present invention comprises a control system 104, an output stage 106 comprising multiple phases, multiple inductors 214, and current sensors 108 for the multiple inductors 214. The control system 104 controls the output stage 106, and the output stage 106 provides current to the load 102 via the inductors 214. The current sensors 108 detect the currents provided by the various phases of the output stage 106 and provide one or more corresponding signals to the control system 104 to control the output stage 106 accordingly. Various aspects of the present invention may be applied to any appropriate power supply, such as buck, boost, buck-boost, forward, flyback, half-bridge, full-bridge, and SEPIC topologies. Further, various aspects of the present invention may be applied to any suitable circuit where lossless sensing of inductor current over multiple current paths is of use.

Figure 2:
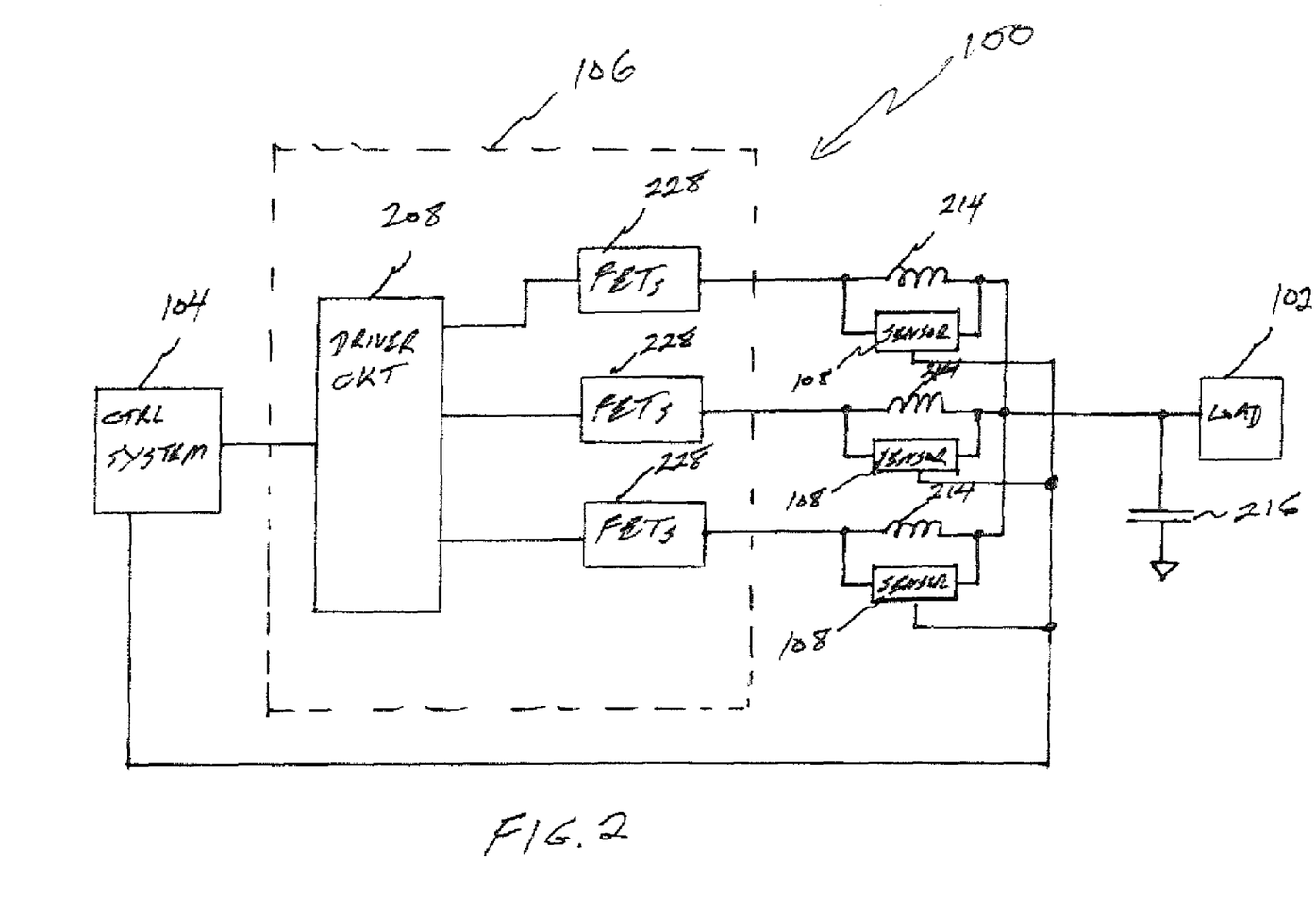
FIG. 2 is a block diagram of a multi-phase power supply according to various aspects of the present invention coupled to a load.

The output stage 106 is responsive to the control system 104 and provides current to the load 102 according to one or more control signals from the control system 104. The output stage 106 may comprise any appropriate system for providing current to the load 102 according to signals from the control system 104, such as a conventional output stage for a buck converter. The output stage 106 may comprise multiple phases. An exemplary multiple-phase output stage 106 for a DC/DC buck converter may comprise one or more driver circuits 208 connected to multiple transistor pairs 228, such as a high-side FET and a low-side FET in each pair 228. The driver circuit 208 alternately drives the FETs in each pair 228 to alternately connect the load 102 to the input voltage according to signals from the control system 104, such as a conventional pulse width modulated control signal. The various pairs 228 may be driven by the driver circuit 208 to meet the power requirements of the load 102 using the multiple phases individually and/or concurrently.

Each phase may include a filter circuit (or a portion of a filter circuit) to smooth the voltage and current applied to the load 102. The filter circuit may comprise any suitable filter system, such as an analog or digital filter. In the present embodiment, the filter circuit comprises passive components, such as an inductor 214 and a capacitor 216. For example, the filter circuit may comprise a buck inductor for each phase and decoupling capacitor. The alternating activation of the FETs 228 by the driver circuit 208 generates a switching waveform or square wave that is subsequently filtered by the filter circuit, which allows the output voltage to be set by controlling the duty cycle of the waveform.

Figure 3:
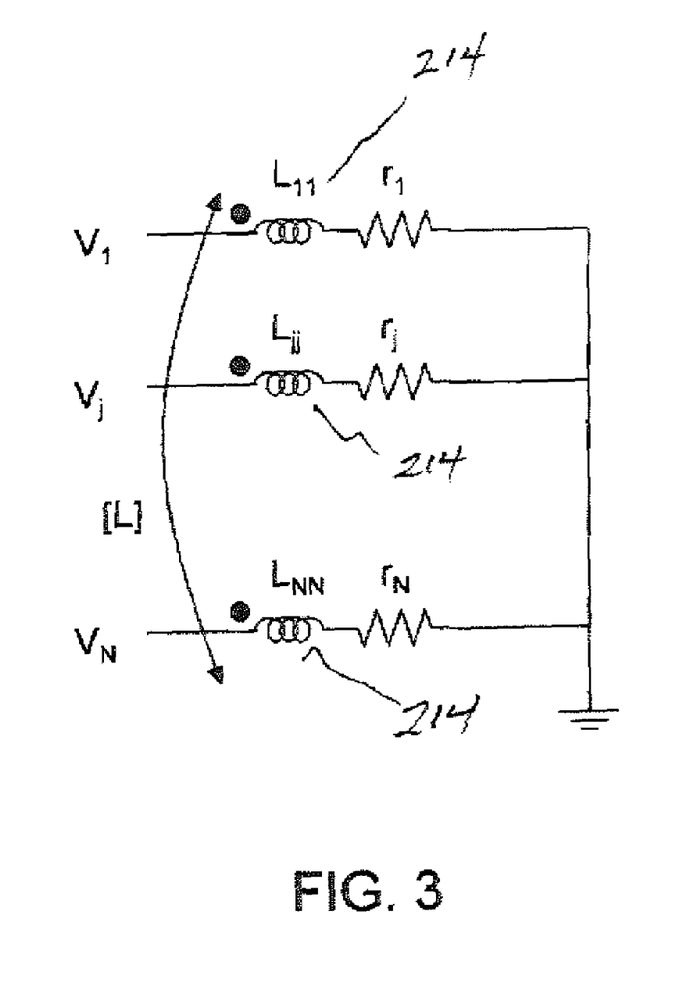
FIG. 3 is a schematic diagram of multiple mutually coupled inductors.

In the present embodiment, each phase includes an inductor 214, and a single capacitor 216 may be connected to all of the phases. In alternative embodiment, each phase may be connected to a dedicated capacitor 216. Referring to FIG. 3, the inductors 214 comprise mutually coupled inductors, such as inductors mutually coupled to reduce the ripple current in each inductor 214 via the coupling current from the other phases to cancel out the current in each phase. Each inductor 214 may exhibit an inductance L and a resistance r (also referred to as DCR) as illustrated in FIG. 3. Furthermore, each of inductors 214 is affected by additional inductances due to the mutual coupling between the inductors 214. The voltages and currents for the branches of the multi-phase coupled inductors 214 may be described by the following equation:

$$V_j = i_j r_j + L_{jj} \frac{\partial}{\partial t} i_j + \sum_{k \neq j} L_{jk} \frac{\partial}{\partial t} i_k$$

where $V_j$ represents the voltage across the branch, $i_j$ is the current in the branch, $r_j$ is the DCR of the inductance in the branch, and $L_{jk}$ represents the coupling inductances as given by the inductance matrix.

Referring again to FIG. 2, the control system 104 generates the control signal to control the output stage 106. The control system 104 may generate the control signal according to any appropriate techniques and criteria, such as using conventional voltage and/or current feedback to control the voltage and/or current applied to the load 102. The control system 104 may also include any appropriate elements and systems for generating the control signal, and the topology of the control system 104 may be analog and/or digital control based. For example, the control system 104 may include a PWM controller generating one or more PWM control signals to control the output stage 106. The control system 104 may control the output stage 106 according to any appropriate criteria, such as output voltage and/or output current at the load 102.

In the present embodiment, the PWM controller comprises a conventional PWM-based voltage regulator for a power supply that adjusts the duty cycle of a PWM control signal according to output voltage and/or current compared to one or more target output voltages and/or currents. The PWM controller may monitor the output voltage as well as the load 102 current provided by each phase, which may facilitate various control functions. For example, the sum of the currents in each inductor 214 is representative of the instantaneous load 102 current, which can be used to implement adaptive voltage positioning (AVP) or current mode control or to monitor the operating condition of the power supply 100. The inductor 214 currents also represent the current through the power devices, the transistor pairs 228, and the inductor 214 of each phase, all of which have maximum current limitations which must be adhered to. Furthermore, the inductor 214 currents may be balanced between the phases so that the load 102 current is evenly distributed among phases, so the current balance control mechanism, which may be integrated into the PWM controller, requires the ability to sense the current in each phase. Thus, the PWM controller may utilize the sensed current to optimize the supply of power, limit the maximum output current, and/or implement load dependent output voltage such as adaptive voltage positioning (AVP).

The control system 104 may further comprise one or more amplifiers to amplify the signals from the current sensors 108. The amplifiers may comprise any appropriate systems for amplifying a signal, such as conventional op-amp-based amplifiers. The amplifiers may comprise separate components or be integrated into another component, such as the sensor 108 or the control system 104. In the present embodiment, the amplifiers are integrated into the control system 104 and provide the amplified current sensor 108 signals to the PWM controller.

Various aspects of the present invention relate to providing a signal to a sensing element. In the present embodiment, the sensing element comprises the control system 104 and/or an amplifier, but the sensing element may comprise any suitable system configured to receive the signal from the current sensors 108.

Each current sensor 108 senses the current through the corresponding inductor 214 and generates a corresponding inductor current signal. The current sensors 108 of the present embodiment are adapted for accurately sensing the current in the inductor 214. The current sensors 108 may thus generate the inductor current signals representing the current in the inductors 214, the load 102, and/or other elements of the power supply 100.

Each current sensor 108 may comprise an inductor self resistance current sensor for monitoring the current in a corresponding inductor 214. For example, each current sensor 108 may comprise an RC circuit adapted such that the RC time constant matches the L/R time constant of the inductor 214. With suitable sensor design and component value selection, the current sensors 108 may generate voltages that are proportional to the instantaneous current in the inductor 214. Further, the current sensors 108 may be normalized, such that the source DC impedance and/or current sensor 108 gain may be scaled to a desired level and/or to achieve a particular range of output voltages for a variety of inductor inductance and self resistance values.

In addition, it may also be desirable to present a fixed impedance to the control system 104, or a constant impedance current sense. For example, the accuracy of control system 104 topologies that are not high impedance may be improved if the current sensor 108 presents a selected DC impedance to the control system 104 independent of the particular characteristics of the inductor 214.

Figure 4:
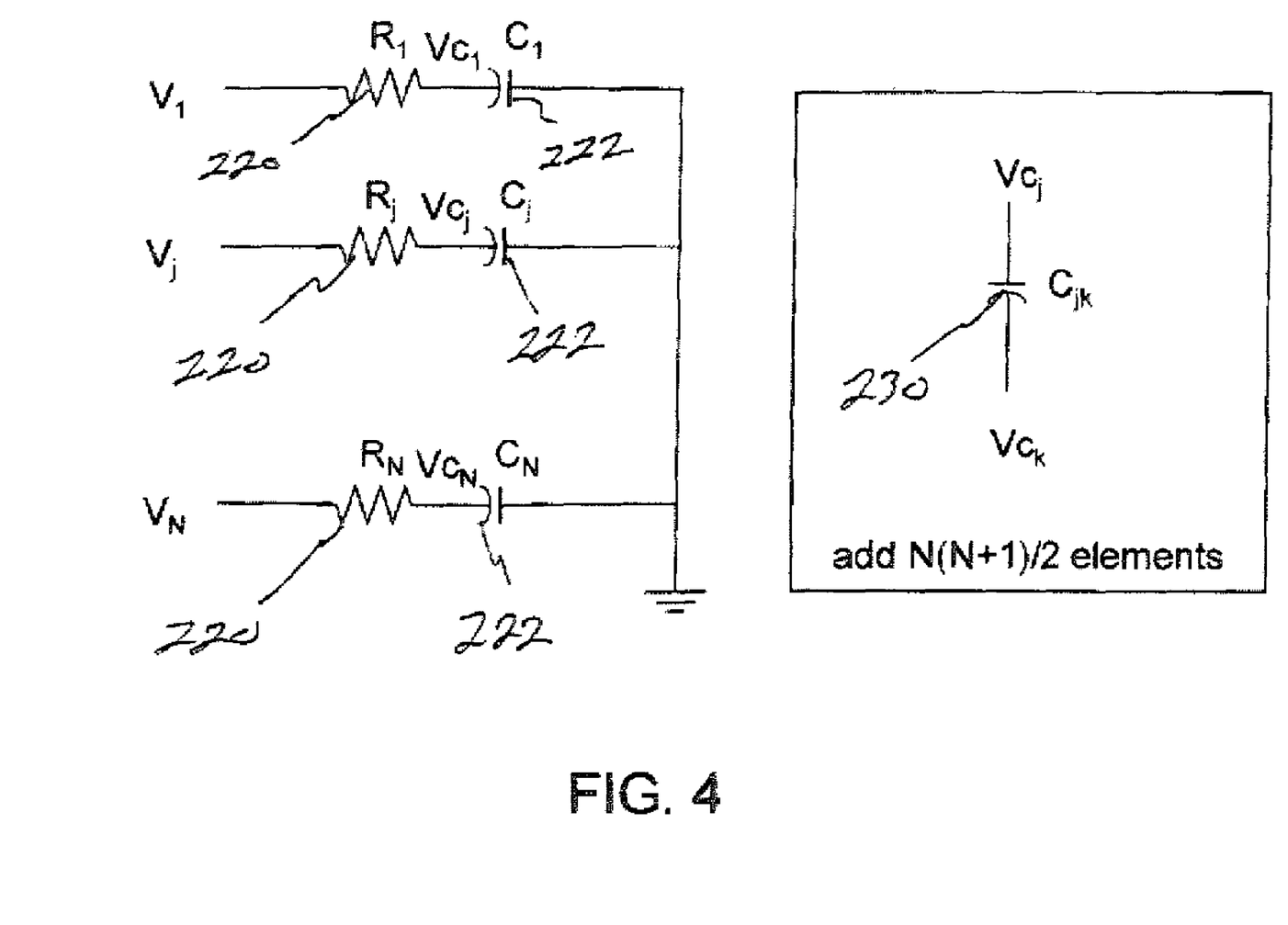
FIG. 4 is a schematic diagram of multiple current sensors and a coupling circuit.

Referring to FIG. 4, in one embodiment, each current sensor 108 comprises a series combination of a first resistor 220 having a resistance R1 and a capacitor 222 having a capacitance C, and the series combination is connected in parallel with a corresponding inductor 214. The current sensors 108 may further comprise coupling capacitors 230 between each of the sense voltage nodes for each current sensor 108. For an N-phase coupled inductor, N(N−1)/2 coupling elements 230 may be used. While the present discussion relates to a specific implementation of the current sensors 108, other current sensor 108 circuit topologies may benefit from the attributes of selectable impedance and/or gain, and the implementations and principles of the present embodiment may be adapted to such other topologies.

For example, the current sensor 108 may include the RC network comprising the first resistor 220 and the capacitor 222 that provides lossless current sensing for the arbitrary multi-phase coupled inductor. Each of the parallel RC branches of the different phases is connected in parallel to a corresponding inductor 214. The current sensor 108 further comprises coupling capacitors 230 having values $C_{jk}$ connected between each of the sense voltage nodes $V_{cj}$, such as at the node between the first resistor 220 and the capacitor 222. The branch voltages and current sense voltages are then given by the following equation:

$$V_j = Vc_j + R_j\left(C_j + \sum_{k \neq j} C_{jk}\right)\frac{\partial}{\partial t}Vc_j + \sum_{k \neq j} R_j C_{jk}\frac{\partial}{\partial t}Vc_k$$

The time constants may be matched such that:

let $$L_{jk}/r_k = R_j C_{jk}$$

$$L_{jj}/r_j = R_j\left(C_j + \sum_{k \neq j} C_{jk}\right)$$

then $$Vc_j = i_j r_j$$

In this manner, the sense voltage in each current sensor 108 branch is representative of the current flowing through the inductor 214 in that phase.

Example 1

Figure 5:
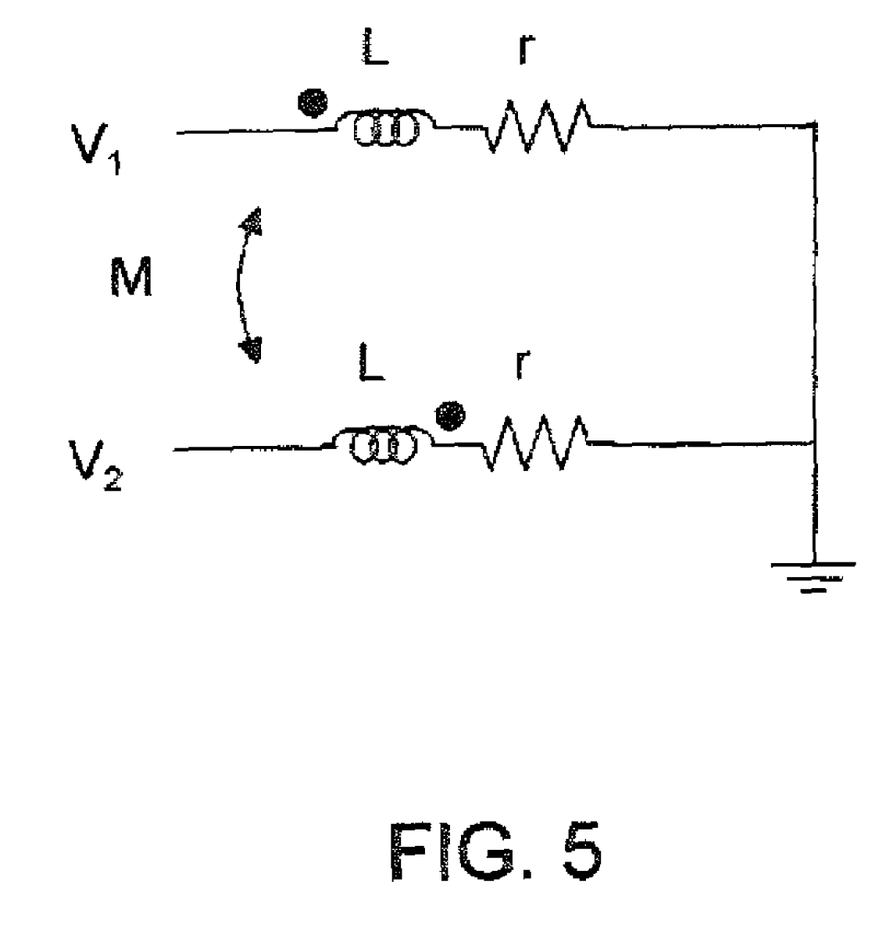
FIG. 5 is a schematic diagram of two mutually coupled inductors.

In an exemplary application, the coupled inductors 214 may include a selected number of phases, and the phases may be matched such that the inductance, mutual inductances, and DCR are equal for all phases. For example, referring to FIG. 5, voltage equations across the inductors 214 for each branch of a 2-phase coupled inductor with matched phases simplifies the branch equations to the following form:

$$V_1 = i_1 r + L\frac{\partial}{\partial t}i_1 - M\frac{\partial}{\partial t}i_2$$

$$V_2 = i_2 r + L\frac{\partial}{\partial t}i_2 - M\frac{\partial}{\partial t}i_1$$

Figure 6:
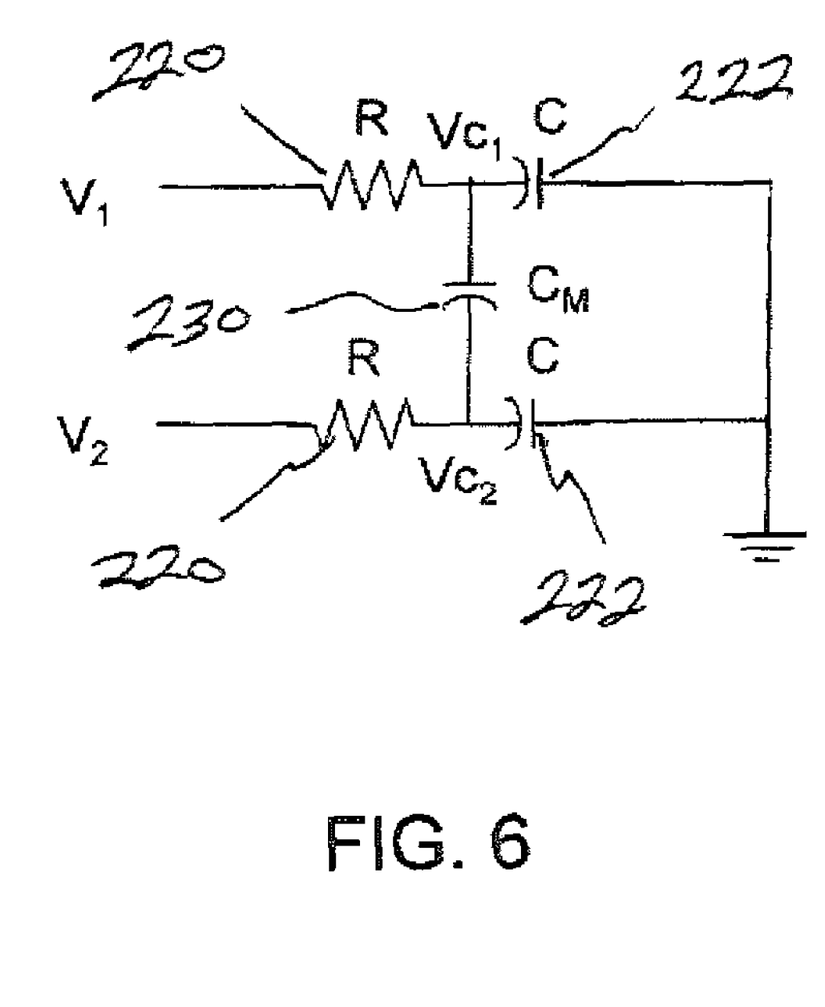
FIG. 6 is a schematic diagram of two current sensors and a coupling circuit.
Figure 7:
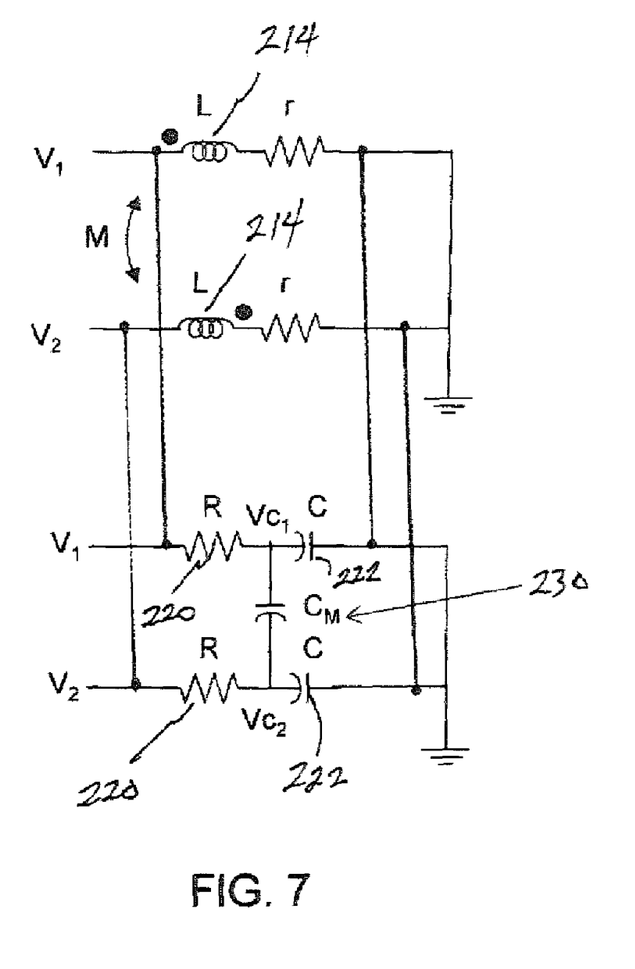
FIG. 7 is a schematic diagram of two mutually coupled inductors and two current sensors and a coupling circuit.

Referring to FIGS. 6 and 7, current sensors 108 for the two coupled inductor 214 branches comprise the first resistor 220 and the capacitor 222 for each branch and a coupling capacitor 230 connected between the branch current sensors 108, such as at the node between the resistor 220 and the capacitor 222 in each branch current sensor 108. The branch equations for the current sensors 108 take the following form:

$$V_1 = Vc_1 + R(C + C_M)\frac{\partial}{\partial t}Vc_1 - RC_M\frac{\partial}{\partial t}Vc_2$$

$$V_2 = Vc_2 + R(C + C_M)\frac{\partial}{\partial t}Vc_2 - RC_M\frac{\partial}{\partial t}Vc_1$$

by matching time constants in the following manner:
let $$M/r = RC_M$$

$$L/r = R(C+C_M)$$

then $$Vc_1 = i_1 r$$

$$Vc_2 = i_2 r$$

Thus, the sense voltages are representative of the branch currents through the two inductors 214.

Figure 8:
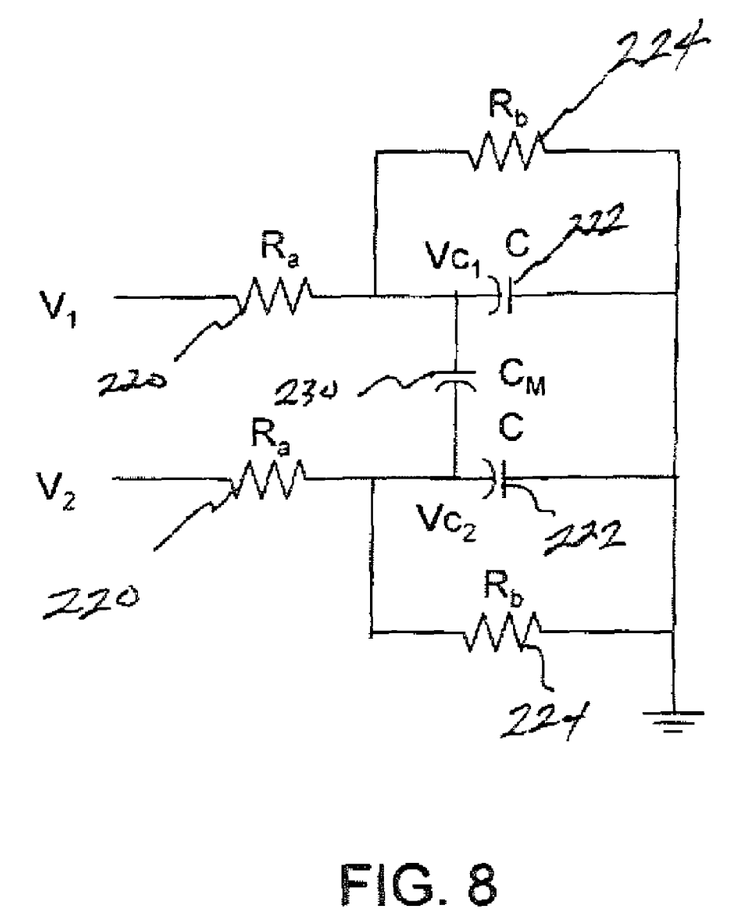
FIG. 8 is a schematic diagram of two current sensors with multiple resistors and a coupling circuit.

The current sensors 108 may be further adapted to not only match the time constants of the inductor 214 branches, but to scale the gain of the sensor such the inductor current signal generated by the current sensor 108 corresponds to a selected range. For example, referring to FIG. 8, a second resistor 224 having a resistance R2 may be connected in parallel with the capacitor 222 in each current sensor 108 branch. In this configuration, the sensed voltage across each capacitor 222 ($V_c(s)$) may be expressed in the s domain as:

$$V_C(s) = \frac{\left(\frac{s \cdot L}{DCR} + 1\right)}{\left(s \cdot \frac{(R_1 \cdot R_2)}{R_1 + R_2} \cdot C + 1\right)} \cdot K \cdot DCR \cdot I_L$$

where K=R2/(R2+R1) and $I_L$ is the current in the inductor.

The resistor values R1 and R2 and the capacitor value C may be selected such that the RC time constant of the current sensor 108 is equal to the L/R time constant of the inductor 214. With the matching time constants, the voltage across the capacitor 222 may be proportional to the current flowing in the inductor 214. For example, to match time constants, the resistor and capacitor values may be selected according to the following equation such that the voltage across the capacitor 222 ($V_c(s)$) is proportional to the voltage across the inductor 214 and thus proportional to the current in the inductor 214:

$$L/DCR = (R1//R2)*C$$

The resistance of the combination of the first and second resistors 220, 224 (represented by (R1//R2)) may be selected such that the signal voltage $V_c(s)$ generated by the current sensor 108 corresponds to a selected range. Thus, the current sensors 108 may be adapted to provide similar outputs for different inductors having various L and DCR values.

Thus, the present current sensors 108 facilitate providing substantially selectable gain. The combination of the first and second resistors 220, 224 facilitates scaling the nominal delta voltage that appears across the capacitor 222 to be a constant range independent of the DCR to optimize design of the amplifier 218 dynamic range for highest accuracy. In many implementations, it is desired to be able to scale the sense voltage so that a fixed amplitude corresponds to a certain current, making the signal amplitude independent of the inductor DCR. This may be referred to as having a gain scaled, or constant gain, current sensor 108. As previously disclosed, the resistor values R1 and R2 may be selected to achieve a selected gain, thus enabling optimization of the dynamic range of current sense amplifier 218 and its related elements. Thus, the sense voltages may be scaled for any appropriate purpose, such as to ensure that a fixed amplitude corresponds to a certain current such that the voltage signal amplitude is independent of the inductor DCR. In addition, it may also be desirable to present a fixed impedance to the PWM current sense amplifier, or constant impedance current sense.

Example 2

Referring still to FIG. 8, the second resistor 224 may be connected in parallel across the capacitor 222. The values for the first and second resistors 220, 224 may be selected to achieve the desired gain and impedance properties. For example, the resistance values $R_a$ and $R_b$ for the first resistor 220 and the second resistor 224 may be chosen with the appropriate ratio for the desired gain, and with the appropriate magnitudes for the desired impedance.

The current sensors 108 may also be normalized such that the source impedance and signal amplitude can be scaled to a constant level independent of the DCR of the inductor, for example to facilitate the implementation of the current sense amplifier in the control system 104. For example, $R_a$ and $R_b$ may be chosen with the appropriate ratio for the desired gain, as well as with the appropriate magnitudes for the desired impedance.

In some current sensor 108 networks, an intentional mismatch of the time constants may be desired. Under dynamic loads, the mismatch causes the instantaneous current sensed to be higher or lower than the actual current. The intentional mismatch may be used to shape the response of the controller to a dynamic event, by essentially underdamping or overdamping the response such that the overall dynamic response is improved.

The particular implementations shown and described are illustrative of the invention and its best mode and are not intended to otherwise limit the scope of the present invention in any way. For the sake of brevity, conventional manufacturing, connection, preparation, and other functional aspects of the system may not be described in detail. The connecting lines shown in the various figures are intended to represent exemplary functional relationships and/or physical couplings between the various elements. Many alternative or additional functional relationships or physical connections may be present in a practical system.

In the foregoing description, the invention has been described with reference to specific exemplary embodiments. Various modifications and changes may be made, however, without departing from the scope of the present invention as set forth and claimed. The description and figures are to be regarded in an illustrative manner, not a restrictive one, and all such modifications are intended to be included within the scope of the present invention. Accordingly, the scope of the invention should be determined by the generic embodiments described and their legal equivalents rather than by merely the specific examples described above. For example, the steps recited in any method or process embodiment may be executed in any order and are not limited to the explicit order presented in the specific examples. Additionally, the components and/or elements recited in any apparatus embodiment may be assembled or otherwise operationally configured in a variety of permutations to produce substantially the same result as the present invention and are not limited to the specific configuration recited in the specific examples.

Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components.

The terms "comprises", "comprising", or any variation thereof, are intended to reference a non-exclusive inclusion, such that a process, method, article, composition, or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, applications, manufacturing specifications, design parameters, or other operating requirements without departing from the general principles of the same.

The invention claimed is:

1. A multiphase power supply for supplying a current to a load through multiple phases of inductors, comprising:
   a control system adapted to control the current through the inductors according to one or more branch inductor current signals;
   multiple current sensors connected to the control system, wherein each current sensor:
      comprises a series combination comprising a capacitor and a resistor, wherein the series combination is adapted to be connected in parallel with one of the inductors; and
      is adapted to generate one of the branch inductor current signals according to a sensed current in the connected inductor; and
   a coupling capacitor coupled between at least two of the current sensors.

2. A multiphase power supply according to claim 1, wherein the coupling capacitor is coupled to a node between the resistor and the capacitor for each current sensor to which the coupling capacitor is coupled.

3. A multiphase power supply according to claim 1, wherein a capacitance of the coupling capacitor is selected according to a resistance of the resistor of the current sensors to which the coupling capacitor is attached, a DC resistance of the inductors to which the coupled current sensors are attached, and a mutual coupling inductance between at least two of the inductors to which the coupled current sensors are attached.

4. A multiphase power supply according to claim 1, wherein each current sensor further comprises a second resistor comprising a first terminal connected to a first terminal of the capacitor and a second terminal connected to a second terminal of the capacitor, wherein:
- the DC impedance of the first resistor, the second resistor, and the capacitor substantially match the DC impedance of the inductor with respect to the control system; and
- the resistance of the first resistor and the resistance of the second resistor are selected according to a desired voltage range of the branch inductor current signal.

5. A multiphase power supply according to claim 4, wherein the resistance of the first resistor and the resistance of the second resistor are further selected according to a self resistance of the inductor and an anticipated current range through the inductor.

6. A multiphase power supply according to claim 1, further comprising an output stage responsive to the control system and adapted to:
- connect to the inductors; and
- supply the current through the inductors according to a signal from the control system.

7. A multiphase power supply according to claim 1, wherein the control system comprises a PWM controller.

8. A current sense network for sensing a current in a first inductor mutually coupled to a second inductor, comprising:
- an inductor branch, comprising:
  - an inductor exhibiting a series parasitic DC resistance (DCR) and comprising an input node and an output node, wherein:
    - the input node is coupled to a branch voltage signal; and
    - the output node generates an output voltage signal responsive to the branch voltage signal;
- a resistive capacitive (RC) sense circuit comprising a resistor and a capacitor in a series combination, wherein:
  - the RC sense circuit is coupled to the input and output nodes of the inductor branch in parallel with the inductor; and
  - a voltage across the capacitor generates a sense voltage signal corresponding to the sensed current flowing through the inductor branch; and
- a coupling circuit coupled to the RC sense circuit and comprising at least one capacitor, wherein a capacitance of the capacitor is selected according to an inductance between the mutually coupled first inductor and second inductor.

9. A current sense network according to claim 8, wherein the coupling circuit is coupled to a node between the resistor and the capacitor of the sense circuit.

10. A current sense network according to claim 8, wherein a capacitance of the coupling circuit capacitor is selected according to a resistance of the resistor of the sense circuit and a DC resistance of the first inductor.

11. A current sense network according to claim 8, wherein the sense circuit further comprises a second resistor comprising a first terminal connected to a first terminal of the sense circuit capacitor and a second terminal connected to a second terminal of the sense circuit capacitor, wherein:
- the DC impedance of the first resistor, the second resistor, and the capacitor substantially match the DC impedance of the inductor branch with respect to the control system; and
- the resistance of the first resistor and the resistance of the second resistor are selected according to a desired voltage range of the branch inductor current signal.

12. A current sense network according to claim 11, wherein the resistance of the first resistor and the resistance of the second resistor are further selected according to a self resistance of the first inductor and an anticipated current range through the first inductor.

13. A method of generating a signal corresponding to a current in a first inductor mutually coupled to a second inductor, comprising:
- connecting a sense circuit comprising a series combination of a capacitor and a first resistor in parallel with the first inductor;
- connecting a coupling circuit to the series combination, wherein the coupling circuit includes a coupling capacitor; and
- selecting a capacitance of the coupling capacitor according to an inductance of the mutual coupling between the first inductor and the second inductor.

14. A method of generating a signal according to claim 13, wherein connecting the coupling circuit comprises connecting the coupling circuit to a node between the first resistor and the sense circuit capacitor.

15. A method of generating a signal according to claim 13, wherein a time constant of the first resistor, the sense circuit capacitor, and the coupling capacitor substantially match a time constant of the first inductor.

16. A method of generating a signal according to claim 13, wherein selecting the capacitance of the coupling capacitor comprises selecting the capacitance of the coupling capacitor according to a resistance of the first resistor and a DC resistance of the first inductor.

17. A method of generating a signal according to claim 13, further comprising connecting a first terminal of a second resistor to a first terminal of the sense circuit capacitor and a second terminal of the second resistor to a second terminal of the capacitor, wherein:
- a DC impedance of the first resistor, the second resistor, and the sense circuit capacitor substantially match a DC impedance of the inductor; and
- the resistance of the first resistor and the resistance of the second resistor are selected according to a desired voltage range of the signal.

18. A method of generating a signal according to claim 17, wherein the resistance of the first resistor and the resistance of the second resistor are further selected according to a self resistance of the inductor and an anticipated current range through the inductor.

* * * * *